United States Patent

Perkins

[11] 4,055,056
[45] Oct. 25, 1977

[54] REVERSIBLE REFRIGERANT SYSTEM AND FOUR-WAY REVERSING VALVE THEREFOR OR THE LIKE

[75] Inventor: Charles H. Perkins, Newtown Square, Pa.

[73] Assignee: Robertshaw Controls Company, Richmond, Va.

[21] Appl. No.: 686,910

[22] Filed: May 17, 1976

Related U.S. Application Data

[62] Division of Ser. No. 526,099, Nov. 22, 1974, Pat. No. 3,972,347.

[51] Int. Cl.² .......................................... F25B 13/00
[52] U.S. Cl. ......................................................... 62/324
[58] Field of Search ................ 62/324; 236/84, 80 G; 137/625.43, 596.17

[56] References Cited

U.S. PATENT DOCUMENTS

| 1,800,352 | 4/1931 | Klees et al. | 236/84 |
| 2,140,451 | 12/1938 | Denison | 236/84 |
| 2,300,263 | 10/1942 | McLeod | 137/596.17 |
| 2,758,447 | 8/1956 | Prosek | 137/625.43 |
| 2,878,832 | 3/1959 | Hoge | 137/596.16 |
| 3,119,308 | 1/1964 | Dantowitz | 137/596.18 |
| 3,190,079 | 6/1965 | Lauer | 62/324 |
| 3,194,266 | 7/1965 | Abbott et al. | 137/596.16 |
| 3,364,942 | 1/1968 | Ney et al. | 137/596.18 |
| 3,664,581 | 5/1972 | Stannow | 236/80 |

FOREIGN PATENT DOCUMENTS

| 1,161,099 | 1/1964 | Germany | 137/596.15 |
| 537,372 | 6/1941 | United Kingdom | 137/596.16 |

Primary Examiner—William E. Wayner
Assistant Examiner—R. J. Charvat
Attorney, Agent, or Firm—Candor, Candor & Tassone

[57] ABSTRACT

In a refrigerant system having a compressor and a pair of coils operatively interconnected to a reversing valve that is adapted to selectively interconnect one of the discharge side and suction side of the compressor to one of the coils while interconnecting the other of the discharge side and the suction side of the compressor to the other of the coils so that one of the coils will act as a condensor and the other coil will act as an evaporator, the improvement wherein the reversing valve has movable ball valve members for affecting the reversing operation thereof under the control of a solenoid operated pilot valve that biases a piston of a piston and cylinder arrangement that is operatively interconnected to the ball valve members.

8 Claims, 4 Drawing Figures

HEATING MODE

COOLING MODE

REVERSIBLE REFRIGERANT SYSTEM AND FOUR-WAY REVERSING VALVE THEREFOR OR THE LIKE

This application is a divisional patent application of its copending parent patent application Ser. No. 526,099, filed Nov. 22, 1974, now U.S. Pat. No. 3,972,347.

This invention relates to an improved refrigerant system and to an improved four-way reversing valve for such a system or the like.

It is well known that four-way reversing valves have been utilized in a refrigerant system to reverse the operation thereof so that the system can operate in a cooling mode thereof or in a heating mode thereof.

In particular, such a refrigerant system has a compressor and a pair of coils operatively interconnected to a reversing valve that is adapted to selectively interconnect one of the discharge side and the suction side of the compressor to one of the coils while interconnecting the other of the discharge side and the suction side of the compressor to the other of the coils so that one of the coils will act as a condensor and the other coil will act as an evaporator.

It is a feature of this invention to provide an improved four-way reversing valve for such a refrigerant system or the like.

In particular, it was found that the conventional four-way reversing valve included a slide member for effecting the valving function thereof and that an unequal thermal expansion of the working parts results due to the valve simultaneously handling hot compressor discharge gas and cool suction gas.

Therefore, it was found, according to the teachings of this invention, that if ball valve members where utilized in the reversing valve, the aforementioned problem was eliminated and the improved valve provided larger valving capacity.

In particular, one embodiment of this invention provides a four-way reversing valve having a housing means provided with two main ports and two reversible ports, the housing means having two pairs of valve seats respectively disposed on opposite sides of the reversible ports in communication therewith. Each pair of valve seats has the main ports disposed outboard of the same and in communication therewith. Movable ball valve means or controlling the valve seats are carried by the housing means so that either one of the main ports can be connected to one of the reversing ports and the remainder of the main ports can be connected to the other of the reversing ports. The ball valve members are operatively interconnected to a piston of a piston and cylinder arrangement, the piston being biased to its operating position by a pilot valve means that is under the control of a solenoid coil.

Therefore, it is an object of this invention to provide an improved refrigerant system having one or more of the novel features set forth above or hereinafter shown or described.

Another object of this invention is to provide an improved four-way reversing valve having one or more of the novel features set forth above or hereinafter shown or described.

Other objects, uses and advantages of this invention are apparent from a reading of this description which proceeds with reference to the accompanying drawings forming a part thereof and wherein.

Figure 1:
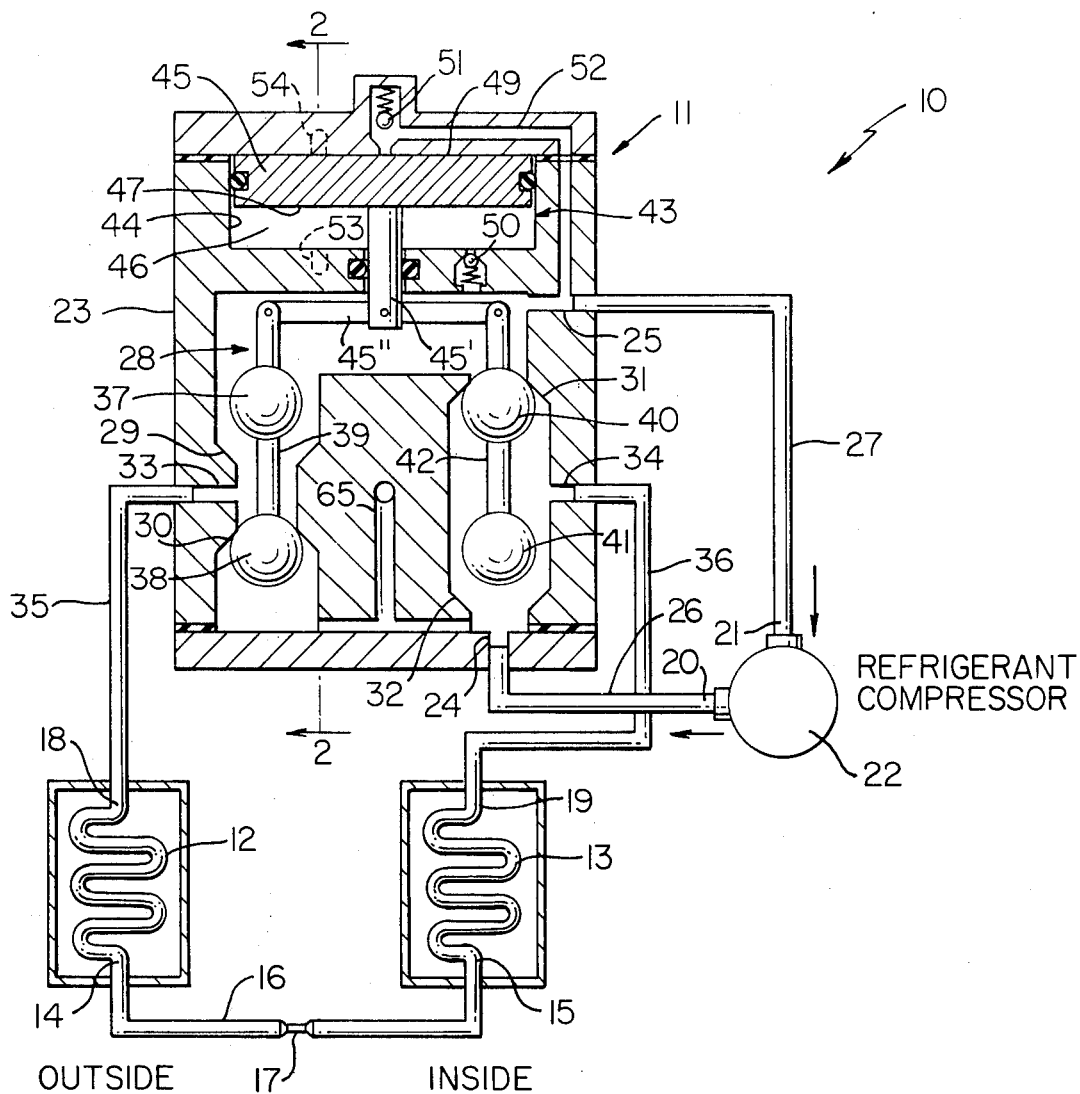
FIG. 1 is a schematic view illustrating the improved refrigerant system of this invention utilizing the improved four-way reversing valve construction of this invention that is shown in cross section, the system being in the heating mode thereof.

While the various features of this invention are hereinafter described and illustrated as being particularly adapted to provide a four-way reversing valve for a refrigerant system, it is to be understood that the various features of this invention can be utilized singly or in any combination thereof to provide a reversing valve for other systems as desired.

Therefore, this invention is not to be limited to only the embodiment illustrated in the drawings, because the drawings are merely utilized for illustrating one of the wide variety of uses of this invention.

Figure 2:
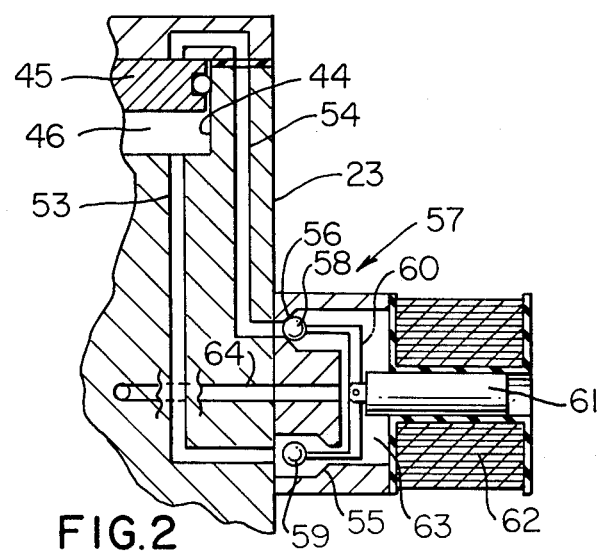
FIG. 2 is a fragmentary cross-sectional view taken substantially on line 2—2 of FIG. 1.

Referring now to FIGS. 1 and 2, the improved refrigerant system of this invention is generally indicated by the reference numeral 10 and includes a four-way reversing valve of this invention that is generally indicated by the reference numeral 11.

The system 10 includes a pair of coils 12 and 13 respectively having one end 14 and 15 thereof interconnected together by conduit means 16 having a restrictor 17 therein while the other ends 18 and 19 are adapted to be interconnected selectively to either the discharge side 20 or suction side 21 of a refrigerant compressor 22 by the reversing valve 11 of this invention in a manner hereinafter described whereby when the coil 13 is disposed inside a building structure and the coil 12 is disposed outside the same, the coil 13 can be utilized as a condensor for the refrigerant system 10 to provide heat for the building or can be utilized as the evaporator for the system 10 in the manner illustrated in FIG. 3 to provide for cooling of the building in a manner well known in the heat pump art or the like.

The four-way reversing valve 11 of this invention comprises a housing means 23 having a pair of main port means 24 and 25 respectively interconnected to the discharge side 20 and the suction side 21 of the refrigerant compressor 22 by conduit means 26 and 27, the port means 24 and 25 leading to the interior of the housing means 23 that has a chamber means 28 formed therein and defining two pairs of aligned valve seats 29, 30, 31 and 32 arranged in such a manner that the main port means 24 and 25 are respectively disposed outboard of the pairs of valve seats 29, 30 and 31, 32.

The housing means 23 also has a pair of reversing ports 33 and 34 formed therein and leading to the chamber means 28 respectively between the pair of valve seats 29, 30 and 32, 32 as illustrated, the reversing ports 33 and 34 being respectively interconnected to the ends 18 and 19 of the coils 12 and 13 by conduit means 35 and 36.

A first pair of spaced ball valve members 37 and 38 are fixed to a rod means 39 with the ball valve members 37 and 38 being respectively disposed outboard of the valve seats 29 and 30 as illustrated whereby when the rod 38 is pulled upwardly in the manner illustrated in FIG. 1, the ball valve member 38 closes off the valve seat 30 to disconnect the reversing port 33 from the main port 24 and the ball valve member 37 opens the valve seat 29 and thereby interconnects the reversing port 33 with the main port 25. Conversely, when the rod 39 is moved downwardly to the position illustrated in FIG. 3, the ball valve member 37 closes off the valve seat 29 to disconnect the reversing port 33 from the main port 25 and the ball valve member 38 opens the valve seat 30 and thereby interconnects the reversing port 33 to the main port 24.

A second pair of spaced ball valve members 40 and 41 are fixed on another movable rod 42 with the ball valve members 40 and 41 respectively being disposed inboard of the valve seats 31 and 32 and arranged in such a manner that when the valve member 42 is pulled upwardly in the manner illustrated in FIG. 1, the ball valve member 40 closes off the valve seat 31 and thereby disconnects the reversing port 34 from the main port 25 while the ball valve member 41 opens the valve seat 32 and thereby interconnects the reversing port 34 to the main port 24 through the opened valve seat 32. Conversely, when the rod means 42 is moved downwardly in the manner illustrated in FIG. 3, the ball valve member 41 closes off the valve seat 32 to disconnect the reversing port 34 from the main port 24 and the ball valve member 40 opens the valve seat 31 to interconnect the reversing port 34 to the main port 25 through the now open valve seat 31.

A piston and cylinder arrangement is carried by the housing means 23 and is generally indicated by the reference numeral 43, the piston and cylinder arrangement 43 being utilized for controlling the movement of the ball valve members 37, 38, 40 and 41 between the operating positions illustrated in FIGS. 1 and FIG. 3 in a manner hereinafter described.

Figure 3:
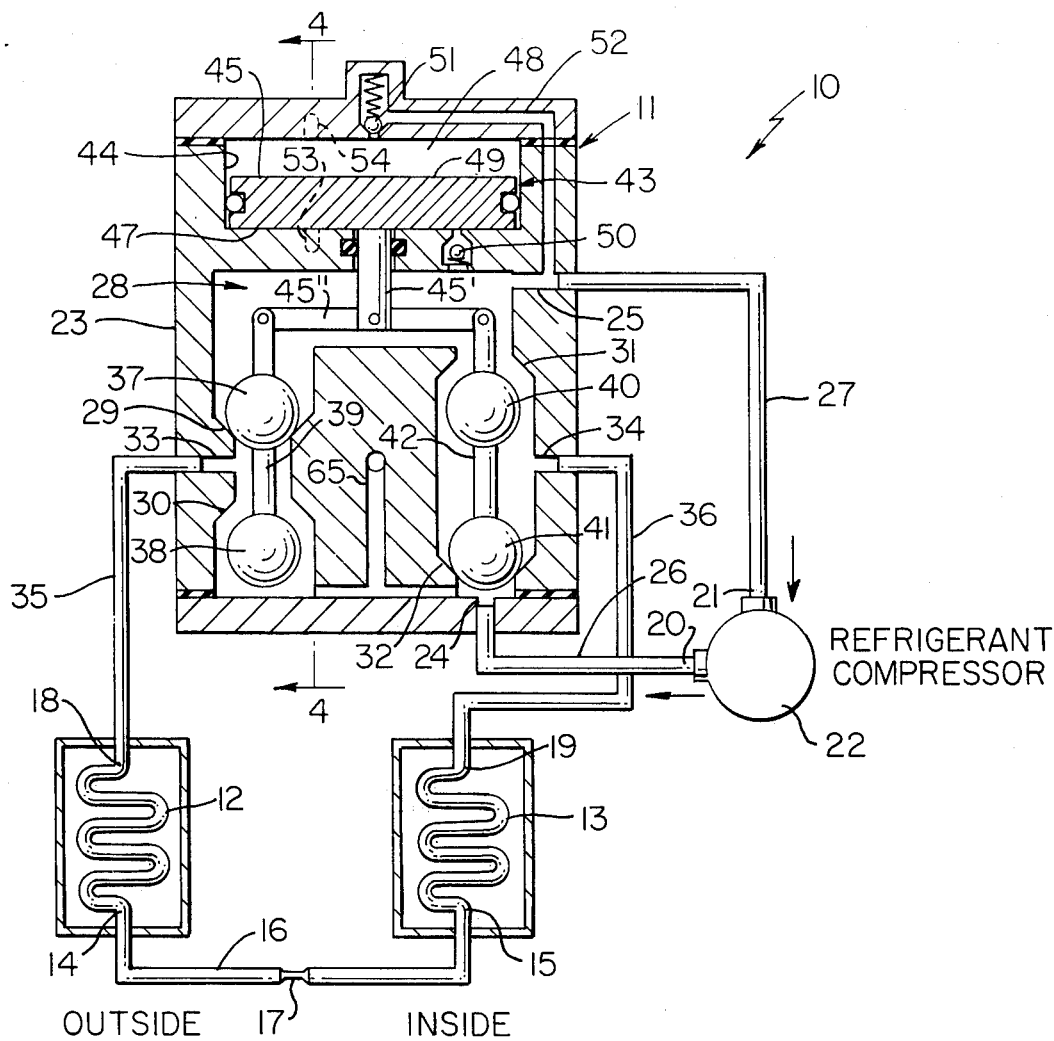
FIG. 3 is a view similar to FIG. 1 and illustrates the refrigerant system in the cooling mode thereof.

The piston and cylinder arrangement 43 comprises a cylinder means 44 formed in the housing means 23 and contains a piston member 45 for sliding up and down therein between the positions illustrated in FIGS. 1 and 3 whereby the piston 45 defines a chamber 46 in the cylinder 44 on the side 47 of the piston and another chamber 48 in the cylinder 44 on the other side 49 of the piston 45.

The piston member 45 has a piston rod 45' that is pivotally interconnected to a medial portion of a yoke member 45" that has its opposed ends respectively and pivotally interconnected to the upper ends of the rods 39 and 42.

The chamber 46 of the cylinder 44 is interconnected by a one-way spring biased ball check valve 50 to the chamber 28 of the housing 23 outboard of the valve seats 29 and 31 while the chamber 48 of the cylinder 44 is interconnected by another one-way spring biased check valve 51 to a passage means 52 of the housing means 23 that also leads to the chamber 28 outboard of the valve seats 29 and 31 whereby the check valves 50 and 51 lead to the suction side 21 of the compressor 22 through the main port 25 for a purpose hereinafter described.

Figure 4:
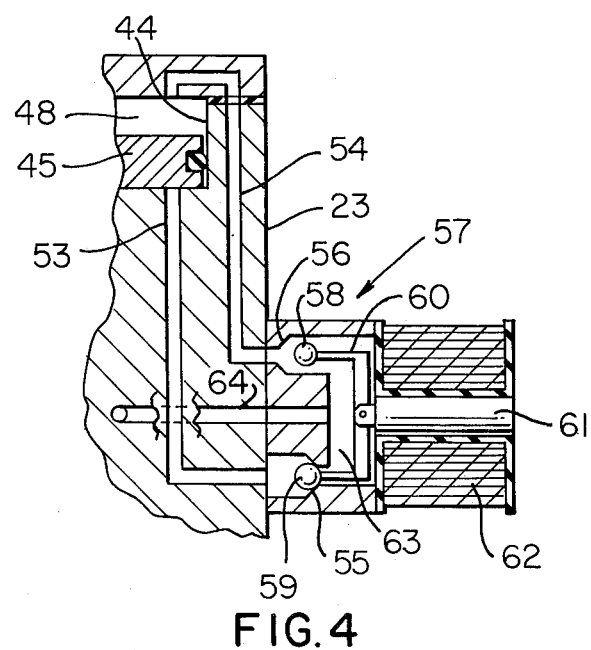
FIG. 4 is a view similar to FIG. 2 and is taken substantially on lines 4—4 of FIG. 3.

The chambers 46 and 48 of the cylinder 44 are also interconnected by passages 53 and 54 to valve seats 55 and 56 of a solenoid operated pilot valve means 57 of the housing means 23 as illustrated in FIGS. 2 and 4. The pilot valve means 57 includes a pair of ball valve members 58 and 59 carried by a yoke member 60 to be moved in unison relative to the valve seats 55 and 56. The yoke member 60 is pivotally mounted to a movable armature or plunger 61 that is adapted to be moved from its normal position illustrated in FIG. 2 to the position illustrated in FIG. 4 when a surrounding solenoid coil 62 is electrically energized in a manner well known in the art.

The valve seats 55 and 56 of the pilot valve means 57 are adapted to be interconnected to an internal chamber 63 of the pilot valve means 57 that is interconnected by a passage means 64 and 65 to the chamber 28 of the housing means 23 at a point outboard of the valve seats 30 and 32 thereof so that the pilot valve chamber 63 is always in fluid communication with the main port 24 and, thus, with the discharge or pressure side 20 of the compressor 22.

In this manner, when the solenoid coil 62 of the pilot valve means 57 is de-energized, the armature 61 assumes the normal position illustrated in FIG. 2, such as by suitable biasing means or the like, wherein the ball valve member 58 closes the valve seat 56 and the ball valve member 59 opens the valve seat 55 whereby the output pressure of the compressor 22 is directed through the open valve seat 55 of the pilot valve means 57 to the chamber 46 of the piston and cylinder arrangement 43 to drive the piston 45 upwardly to the position illustrated in FIG. 1 and hold the ball valve members 37, 38, 40 and 41 in the up position illustrated in FIG. 1 for providing a heating mode of the coil 13 in a manner hereinafter described. However, when the coil 62 is energized in the manner illustrated in FIG. 4, the same pulls the armature 61 to the right in FIG. 4 to cause the ball valve member 59 to close the valve seat 55 and the ball valve member 58 to open the valve seat 56 whereby the discharge side 20 of the compressor 22 is now interconnected through the open valve seat 56 to the chamber 48 of the piston and cylinder arrangement 43 to drive the piston 45 downwardly and thereby move the ball valve members 37, 38, 40 and 41 down to the position illustrated in FIG. 3 so that the coil 13 of the system 10 now provides a cooling operation as will be apparent hereinafter.

Therefore, it can be seen that the four-way reversing valve 11 of the invention can be formed of a relatively few parts to provide a ball poppet valve arrangement to be operated in the system 10 in a manner now to be described.

Assuming that it is desired to operate the refrigerent system 10 in the heating mode thereof whereby the coil 13 will act as a condensor and the coil 12 thereof will act as an evaporator, the pilot valve means 57 is disposed in the condition illustrated in FIG. 2 by having the coil 62 thereof de-energized whereby the ball valve member 58 closes the valve seat 56 and the ball valve member 59 opens the valve seat 55. Thus, the discharge side 20 of the compressor 22 is interconnected to the chamber 46 of the piston and cylinder arrangement 43 through the open valve seat 55 to drive the piston 45 upwardly. Such upward movement of the piston 45 causes the check valve 51 to open and thereby exhaust the fluid in the collapsing chamber 48 into the suction side 25 of the compressor 22, the ball check valve 50 being disposed in its closed position during the expanding of the chamber 46 in the manner illustrated in FIG. 1.

When the piston 45 is in its up position, the ball valve members 37, 38, 40 and 41 have been moved upwardly to the position illustrated in FIG. 1 by the interconnecting piston rod 45' and yoke 45". Thus, the ball valve member 38 closes the valve seat 30 while the ball valve member 40 closes the seat 31 whereby the discharge side 20 of the compressor 22 is interconnected through the open valve seat 32 to the reversible port 34 and, thus, to the coil 13 so that the coil 13 will act as a condensor for the refrigerant fluid and the coil 12 will act as an evaporator therefor since the coil 12 is interconnected by the reversible port 33 through the open valve seat 29 to the main port means 25 that leads to the suction side 21 of the compressor 22.

In this manner, the coil 13 of the system 10 provides a heating function for the building containing the same as long as the reversible valve 11 remains in the condition illustrated in FIG. 1 in a manner well known in the heat pump art.

However, when it is desired to switch the system 10 to its cooling mode, the coil 62 of the pilot valve means 57 is energized in the manner illustrated in FIG. 4 to cause the armature 61 to move to the right and thereby cause the ball valve member 58 to open the valve seat 56 while the ball valve member 59 closes the seat 55 as illustrated in FIG. 4. Thus, pressure from the discharge side 20 of the compressor 22 now passes through the opened valve seat 56 to the upper chamber 48 of the cylinder 44 to drive the piston 45 downwardly exhausting the fluid in the collapsing chamber 46 through the ball valve check valve 50 while the ball check valve 51 is disposed in its closed condition as illustrated in FIG. 3 as the chamber 48 is expanding.

Accordingly, the downwardly moving piston 45, through the piston rod 45' and yoke member 45'', moves the ball valve members 37, 38, 40 and 41 downwardly so that the ball valve member 37 close the valve seat 29 and the ball valve member 41 closes the valve seat 32.

In this manner, the suction side 21 of the compressor 22 is now interconnected by the main port means 25 to the reversible port 34 through the opened valve seat 31 so that the coil 13 is now interconnected to the suction side 21 of the compressor 22 to act as the evaporator for the refrigerant fluid being cycled by the compressor 22. Likewise, the reversible port 33 that is interconnected to the coil 12 is now interconnected through the opened valve seat 30 to the discharge side 20 of the compressor 22 whereby the coil 20 now acts as a condensor for the system 10.

Accordingly, the coil 13 acting as an evaporator now causes cooling of the building containing the same whereby it can be seen that system 10 operates in the manner illustrated in FIGS. 3 and 4 to provide a cooling mode thereof.

Thus, it can be seen that this invention provides an improved refrigerant system wherein the improved four-way reversing valve 11 of this invention is adapted to effectively switch the system 10 between the heating mode thereof of FIG. 1 to the cooling mode thereof of FIG. 3 and back again depending upon condition of the pilot valve means 57.

Therefore, this invention not only provides an improved refrigerant system, but also this invention provides an improved four-way reversing valve therefor or the like.

While the form of the invention now preferred has been illustrated and described as required by the Patent Statute, it is to be understood that other forms be utilized and still come within the scope of the appended claims.

What is claimed is:

1. In a refrigerant system having a compressor and a pair of coils operatively interconnected to a reversing valve for selectively interconnecting one of the discharge side and the suction side of said compressor to one of said coils while interconnecting the other of the discharge side and the suction side of said compressor to the other of said coils so that one of said coils will act as a condensor and the other coil will act as an evaporator, the improvement wherein said reversing valve has four separate movable ball valve means for effecting the reversing operation thereof, said reversing valve having a housing means carrying said ball valve means, a single actuating means carried by said housing means, and a lever pivotally interconnected to said actuating means and to said ball valve means to control said reversing operation thereof.

2. In a refrigerant system as set forth in claim 1, said housing means being provided with a pair of port means respectively leading to said coils and having two pairs of valve seats respectively on opposite sides of said port means, said ball valve means controlling said valve seats.

3. In a refrigerant system as set forth in claim 2, said ball valve means for each of said pair of valve seats comprising a pair of interconnected spaced apart balls.

4. In a refrigerant system as set forth in claim 3, one pair of said spaced apart balls being respectively disposed outboard of their respective pair of valve seats.

5. In a refrigerant system as set forth in claim 3, one pair of said spaced apart balls being respectively disposed inboard of their respective pair of valve seats.

6. In a refrigerant system as set forth in claim 3, said pairs of interconnected balls being interconnected together to move as a unit.

7. In a refrigerant system as set forth in claim 1, said actuator means comprising a fluid operated piston and cylinder means.

8. In a refrigerant system as set forth in claim 7, a pilot means carried by said housing means for controlling said fluid operated piston and cylinder means.

* * * * *